US009037507B2

(12) United States Patent
Tate, Jr.

(10) Patent No.: US 9,037,507 B2
(45) Date of Patent: May 19, 2015

(54) METHOD TO FACILITATE OPPORTUNITY CHARGING OF AN ELECTRIC VEHICLE

(75) Inventor: Edward D. Tate, Jr., Grand Blanc, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 327 days.

(21) Appl. No.: 12/766,963

(22) Filed: Apr. 26, 2010

(65) Prior Publication Data

US 2010/0274690 A1  Oct. 28, 2010

Related U.S. Application Data

(60) Provisional application No. 61/173,324, filed on Apr. 28, 2009.

(51) Int. Cl.
*B60L 11/18* (2006.01)
*G06Q 30/04* (2012.01)
*G06Q 40/00* (2012.01)

(52) U.S. Cl.
CPC ............ *B60L 11/1824* (2013.01); *G06Q 30/04* (2013.01); *Y02T 10/7005* (2013.01); *Y02T 10/7088* (2013.01); *Y02T 90/12* (2013.01); *Y02T 90/14* (2013.01); *Y02T 90/16* (2013.01); *Y02T 90/169* (2013.01); *Y04S 30/14* (2013.01); *Y04S 50/12* (2013.01); *G06Q 40/12* (2013.01)

(58) Field of Classification Search
CPC ..... G06Q 30/04; Y02T 90/12; B60L 11/1824
USPC ............................................ 320/109; 705/34
See application file for complete search history.

(56) References Cited

U.S. PATENT DOCUMENTS

| 7,038,425 | B2 | 5/2006 | Chuang |
| 7,804,274 | B2* | 9/2010 | Baxter et al. ................. 320/109 |
| 8,102,248 | B2* | 1/2012 | Yasuda et al. .............. 340/426.1 |
| 2008/0228613 | A1 | 9/2008 | Alexander |
| 2009/0091291 | A1* | 4/2009 | Woody et al. ................. 320/109 |
| 2009/0174365 | A1* | 7/2009 | Lowenthal et al. ........... 320/109 |
| 2009/0210357 | A1* | 8/2009 | Pudar et al. ................... 705/412 |
| 2009/0281679 | A1 | 11/2009 | Taft et al. |

(Continued)

FOREIGN PATENT DOCUMENTS

| WO | WO 96/01520 | 1/1996 |
| WO | WO-2008073453 A1 | 6/2008 |

OTHER PUBLICATIONS

Letendre, S. E., & Willett Kempton:, R. S. (2002). The V2G concept: A new model for power? Public Utilities Fortnightly, 140(4), 16-26. Retrieved from http://search.proquest.com/docview/213185664?accountid=14753.*

(Continued)

*Primary Examiner* — Scott Zare

(57) ABSTRACT

A method for electrically charging a high-voltage battery of a subject vehicle includes resolving a geographic location of the subject vehicle at a remote charging site, electrically charging the high-voltage battery through a connection of the subject vehicle to an electric power outlet at the remote charging site, monitoring cumulative electric power flow to the high-voltage battery of the subject vehicle, communicating the cumulative electric power flow to a central server, and reconciling billing for the cumulative electric power flow between an owner of the subject vehicle and an owner of the remote charging site.

7 Claims, 2 Drawing Sheets

(56) References Cited

U.S. PATENT DOCUMENTS

2010/0065627 A1* 3/2010 Outwater .................. 235/381
2010/0145885 A1* 6/2010 Graziano et al. ............ 705/412
2010/0198751 A1* 8/2010 Jacobus .................... 705/412
2010/0225475 A1* 9/2010 Karch et al. ............... 340/540

OTHER PUBLICATIONS

U.S. Appl. No. 12/766,963, filed Apr. 26, 2010, Tate.
U.S. Appl. No. 12/766,968, filed Apr. 26, 2010, Tate.
U.S. Appl. No. 12/766,973, filed Apr. 26, 2010, Tate.

* cited by examiner

METHOD TO FACILITATE OPPORTUNITY CHARGING OF AN ELECTRIC VEHICLE

CROSS REFERENCE TO RELATED APPLICATIONS

This application claims the benefit of U.S. Provisional Application No. 61/173,234, filed on Apr. 28, 2009, which is incorporated herein by reference.

TECHNICAL FIELD

This disclosure is related to electric vehicle recharging.

BACKGROUND

The statements in this section merely provide background information related to the present disclosure and may not constitute prior art.

Vehicles using electric power for propulsion include for example electric vehicles, range-extended electric vehicles, and plug-in hybrid electric vehicles. Electrically-powered vehicles are configured to reduce direct consumption of fossil fuels. Electrical energy storage devices for such vehicles may need to be periodically recharged. Such charging may be accomplished for example at the owner's residence. Charging at remote locations may be required.

SUMMARY

A method for electrically charging a high-voltage battery of a subject vehicle includes resolving a geographic location of the subject vehicle at a remote charging site, electrically charging the high-voltage battery through a connection of the subject vehicle to an electric power outlet at the remote charging site, monitoring cumulative electric power flow to the high-voltage battery of the subject vehicle, communicating the cumulative electric power flow to a central server, and reconciling billing for the cumulative electric power flow between an owner of the subject vehicle and an owner of the remote charging site.

BRIEF DESCRIPTION OF THE DRAWINGS

One or more embodiments will now be described, by way of example, with reference to the accompanying drawings, in which.

DETAILED DESCRIPTION

Figure 1:
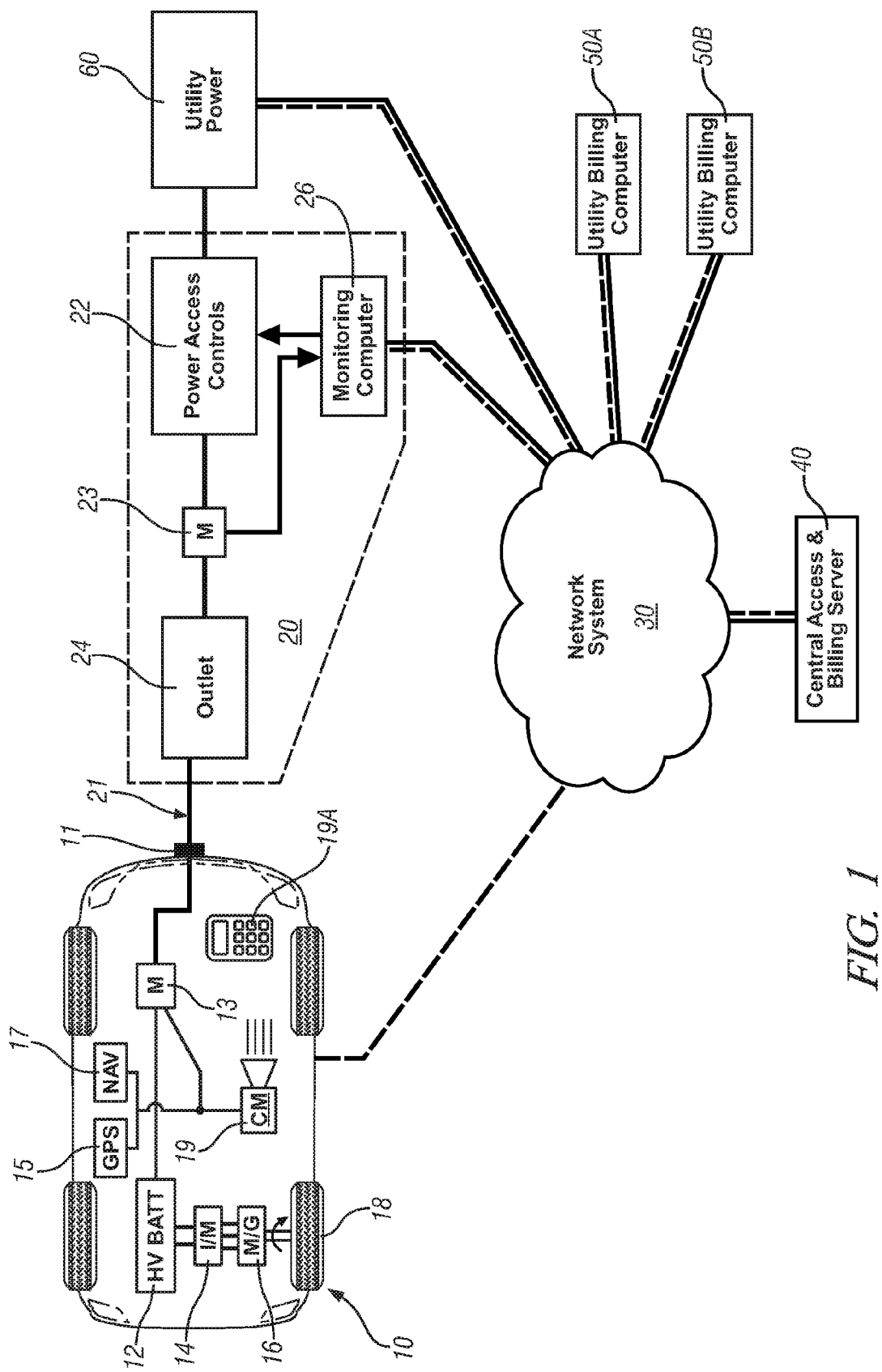
FIG. 1 is a schematic diagram of a charging management system for electrically charging a subject vehicle at a remote charging site using electric power originating from a stationary source of electrical power in accordance with the present disclosure.

Referring now to the drawings, wherein the showings are for the purpose of illustrating certain exemplary embodiments only and not for the purpose of limiting the same, FIG. 1 schematically illustrates a charging management system for electrically charging a subject vehicle 10 at a remote charging site 20 using electric power originating from a stationary source of electrical power, e.g., an electric power utility 60. The charging management system is configured to identify location and an owner of the subject vehicle 10, resolve location of the subject vehicle 10 at a specific electric power outlet 24 at the remote charging site 20, unlock the electric power outlet 24, transfer electric power to the subject vehicle 10 while monitoring and recording cumulative electric power flow, and communicate a magnitude of the cumulative electric power flow transferred to the subject vehicle 10 to a billing computer associated with the electric power utility 60 to bill the owner of the subject vehicle 10. It is appreciated that the remote charging site 20 can include any charging site not associated with the owner of the subject vehicle 10. It is appreciated that the remote charging site 20 may include a single one or a plurality of electric power outlets 24.

The subject vehicle 10 is an electrically powered vehicle that for example may be one of an electric vehicle, a range-extended electric vehicle, and a plug-in hybrid electric vehicle. The subject vehicle 10 preferably has a propulsion system that uses electric power supplied from an on-board electrical energy storage device, hereafter referred to as a high-voltage battery (HV Batt) 12. It is appreciated that the high-voltage battery 12 can include one or more multi-cell devices, ultracapacitors, or other electrical energy storage devices fabricated from materials that may include lithium-ion and other materials, with the scope of this disclosure not limited thereby. The exemplary propulsion system includes the high-voltage battery 12 electrically coupled to an electric motor/generator (M/G) 16 via an electric power inverter (I/M) 14. The electric motor/generator 16 converts electric energy to torque to provide propulsion power to one or more vehicle wheels 18. The high-voltage battery 12 electrically connects to an on-vehicle electrical charger connector 11 that electrically connects via an external cable 21 at the remote charging site 20 during a vehicle key-off period to effect electrical recharging of the high-voltage battery 12. An on-board electric power meter (M) 13 monitors and records cumulative electric power flow to the high-voltage battery 12, preferably in kilowatt-hours (kW-h). The high-voltage battery 12 is recharged using electric power originating from the electric power utility 60 via an electrical power distribution grid that connects to the remote charging site 20.

The subject vehicle 10 preferably includes a global positioning system (GPS) 15 coupled to a navigation system (NAV) 17, which are useable to define a geographic location of the subject vehicle 10. The electric power meter 13 is configured to monitor and record cumulative electrical power flow (e.g., in kW-h) transferred to the high-voltage battery 12 through the electrical charger connection 11. The electric power meter 13 is preferably configured to capture and record a time and date of an electrical charging event, a geographic location of the subject vehicle 10 including a location and identifying elements related to the remote charging site 20, the owner of the remote charging site 20, and a magnitude of cumulative electric power flow (e.g., kWh) transferred to the subject vehicle 10. The subject vehicle 10 includes a control module (CM) 19 configured to monitor signal outputs from the electric power meter 13 and control electric power flow through the electric power meter 13 in one embodiment. In one embodiment, the control module (CM) 19 has a wireless telematics communications system capable of extra-vehicle communications, including communication via a communications network system (Network System) 30 having wireless and wired communications capabilities. The control module 19 communicates vehicle identification information to a remote server (Central Access & Billing Server) 40 including the vehicle owner and/or account name, time and date, the approximate geographic location of the vehicle and a presence of electric power flow thereat. Vehicle identification information in the form of vehicle make, model, model year, VIN, color, and/or other parameters may also be communicated. Alternatively, the control module (CM) 19 has a wireless telematics communications system capable of short-range wireless communications to a handheld device 19A, e.g., a cell phone. In one embodiment the handheld device 19A is loaded with a software application that includes a wireless protocol to communicate with the control module 19, and the handheld device 19A executes the extra-vehicle communications, including communication to the remote server 40 via the communications network system 30. In one embodiment, the vehicle information including the vehicle owner and/or account name, time and date, the approximate geographic location of the vehicle, presence of electric power flow thereat and vehicle identification information in the form of vehicle make, model, model year, VIN, color, and/or other parameters may originate from the control module 19, and be communicated to the communications network system 30 via the handheld device 19A. In one embodiment, a portion of the vehicle information including, e.g., the account name, time and date, and the approximate geographic location of the vehicle may originate from the handheld device 19A for communication via the communications network system 30 to the remote server 40.

The remote charging site 20 includes the electric power outlet 24 that electrically connects to the electric power utility 60 preferably via a power access control device 22. The power access control device 22 may be an optional device employed by commercial facilities or workplaces. Magnitude of cumulative electric power flow is monitored using an electric power meter (M) 23. A monitoring computer 26 controls the power access control device 22 to control electric power flow between the electric power utility 60 and the electric power outlet 24. The monitoring computer 26 connects to the network system 30 via either or both wireless and wired communications.

The remote server 40 is configured to provide for central access and billing at a remote site. The remote server 40 communicates via the network system 30 with the monitoring computer 26 to control, i.e., lock and unlock the power access control device 22 to prevent and permit electric power flow through the electrical power outlet 24. The monitoring computer 26 communicates via the network system 30 to the remote server to transmit a magnitude of the cumulative electric power flow transferred to the subject vehicle 10. The remote server 40 communicates via the network system 30 with first and second utility billing systems (Utility Billing Computer) 50A and 50B associated with first and second electrical energy suppliers.

The first and second electrical energy suppliers are associated with and/or manage electric power flow from electric power utilities, including the electric power utility 60. First and second utility billing systems (Utility Billing Computer) 50A and 50B are associated with the first and second electrical energy suppliers. For purposes of this description, the owner of the subject vehicle 10 has an electric utility account with the first electrical energy supplier and the corresponding first utility billing system 50A, and the owner of the remote charging site 20 has an electric utility account with the second electrical energy supplier and the corresponding second utility billing system 50B. It is appreciated that the first and second utility billing systems (Utility Billing Computer) 50A and 50B and the first and second electrical energy suppliers may be common entities or separate entities.

The electrical energy supplier has a mechanism to reconcile electrical energy bills to credit and debit individual accounts. As used herein, debiting an account also means billing or invoicing. Reconciling the electrical energy bills includes billing the owner of the subject vehicle 10 for the magnitude of cumulative electric power flow to the subject vehicle 10 by debiting the electric utility account with the first electrical energy supplier using the corresponding first utility billing system 50A, and correspondingly crediting the electric utility account with the second electrical energy supplier using the corresponding second utility billing system 50B associated with the owner of the remote charging site 20. As is appreciated, communications between the remote server 40, the monitoring computer 26, and the first and second utility billing computers 50A and 50B, respectively, may be accomplished via the network system 30 having wireless and wired communications capabilities. Account reconciliation can include, but is not limited to issuing a check and initiating an electronic funds transfer.

Figure 2:
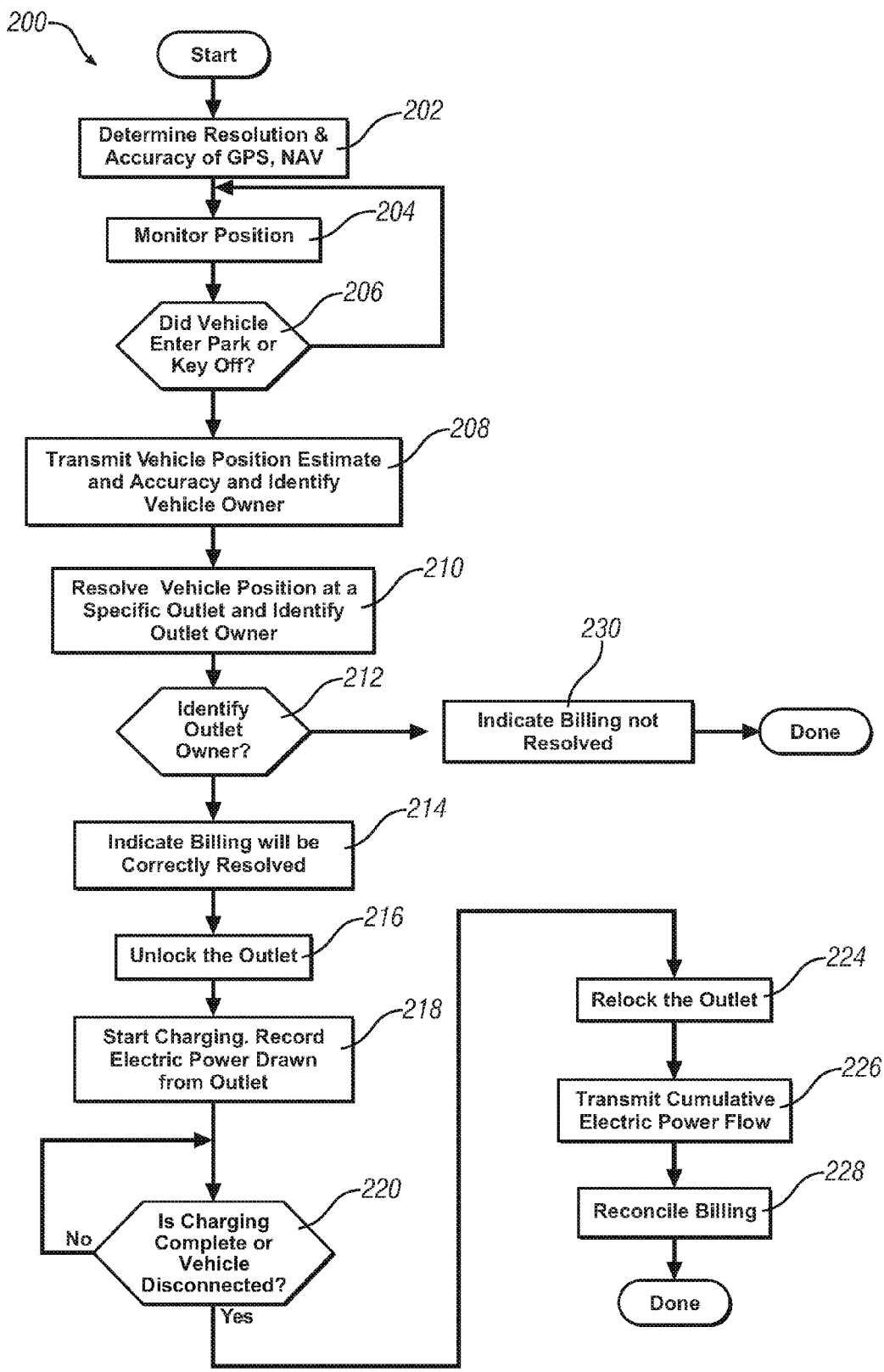
FIG. 2 is a flowchart illustrating a method for electrically charging the subject vehicle and reconciling billing for an owner of a subject vehicle and an owner of a remote charging site in accordance with the present disclosure.

FIG. 2 shows a process 200 related to electrically charging an energy storage device of a vehicle at a remote location, described with reference to the subject vehicle 10 and associated remote charging site 20 and network system 30 of FIG. 1. The process 200 is depicted in flowchart form for ease of description, and includes electrically charging the high-voltage battery 12 of the subject vehicle 10 using the remote charging site 20 at a known location, and reconciling accounts by debiting an account associated with the owner of the subject vehicle 10 (Vehicle Owner) for the magnitude of the cumulative electric power flow to the subject vehicle 10 and crediting an account associated with the owner of the remote charging site 20 (Outlet Owner).

The process includes determining a resolution and accuracy of the GPS 15 and the navigation system 17 (202).

The GPS 15 and navigation system 17 monitor the position of the subject vehicle 10 to resolve a geographic location thereof at the known resolution and accuracy (204).

When the subject vehicle 10 is placed in Park and/or keyed off (206), the subject vehicle 10 uses the telematics communications system of the control module 19 to communicate via the network system 30 to the remote server (Central Access & Billing Server) 40 (208). The subject vehicle 10 transmits information including identity of the owner of the subject vehicle 10 and an estimate of the location of the subject vehicle 10 with accompanying resolution and accuracy, as the GPS 15 and navigation system 17 may lack sufficient resolution and/or accuracy to resolve the location of the subject vehicle 10 relative to a specific electric power outlet 24 at the remote charging site 20. When there is insufficient resolution in the location of the subject vehicle 10, known techniques that rely upon map matching and known landmarks can be used to improve the estimated location of the subject vehicle 10 and resolve the specific electric power outlet 24 at the remote charging site 20 and identify ownership thereof. Resolving location the subject vehicle 10 at the specific electric power outlet 24 at the remote charging site 20 may be performed onboard the subject vehicle 10 or off-board at a remote location. Resolving the location of the specific electric power outlet 24 at the remote charging site 20 means that the location of the subject vehicle 10 has been definitely associated with the specific electric power outlet 24 at the remote charging site 20.

The remote server 40 resolves the location of the subject vehicle 10 to a specific electric power outlet 24 at the remote charging site 20, and attempts to establish an account billing trail (210).

The remote server 40 attempts to identify and resolve an owner of the electric power outlet 24 at the remote charging site 20 (212), and when the identity of the owner of the electric power outlet 24 cannot be resolved, informs the vehicle operator (230), who may then move the subject vehicle 10 to another electric power outlet 24 or another remote charging site 20.

Otherwise, the remote server 40 informs the vehicle operator that the owner of the specific electric power outlet 24 at the remote charging site 20 has been identified and that billing reconciliation will be resolved (214). The remote server 40 authorizes billing transfer to the account of the owner of the subject vehicle 10, and an on-vehicle indicator shows that electricity consumption will be paid by the owner of the subject vehicle 10.

The remote server 40 sends an authorization signal via the network system 30 to the monitoring computer 26, which unlocks the power access control device 22 and permits electric power flow from the electric power utility 60 to the subject vehicle 10 when it is electrically connected to the electric power outlet 24 via cable 21 (216).

Either or both the on-board electric power meter 13 and the electric power meter 23 of the remote charging site 20 monitor and record electric power flow draw and determine a magnitude of the cumulative electric power flow (218).

When charging is completed or the subject vehicle 10 is disconnected from the remote charging site 20 (220), the monitoring computer 26 locks the power access control device 22 (224).

The monitoring computer 26 transmits to the remote server 40 a total electric power draw, i.e., a magnitude of the cumulative electric power flow to the subject vehicle 10. The magnitude of the cumulative electric power flow from the specific electric power outlet 24 of the remote charging site 20 to the subject vehicle 10 can then be communicated to the first and second electrical energy suppliers (226). The first and second utility billing computers 50A and 50B, respectively, reconcile accounts between the owner of the subject vehicle 10 and the owner of the electric power outlet 24 at the remote charging site 20 to effect payment for the electrical power transferred to the subject vehicle 10 (228). Revised billing statements are generated or funds can be transferred for reimbursement. A thank you e-mail or other acknowledgement confirming the billing transfer may be immediately delivered. The system allows an operator of a plug-in hybrid vehicle, an extended range electric vehicle or an electric vehicle to remotely recharge while reconciling billing for the electricity.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for electrically charging a high-voltage battery of a subject vehicle, the method comprising:
   at a handheld device corresponding to an owner of the subject vehicle:
      monitoring a portion of subject vehicle identification information originating at the handheld device, the portion of the subject vehicle identification information including at least an owner of the subject vehicle, time and date information and a geographical location of the subject vehicle, and
      transmitting the geographical location of the subject vehicle to a control module of the subject vehicle;
   onboard the subject vehicle:
      resolving the geographic location of the subject vehicle at a specific power outlet of a remote charging site independent of the subject vehicle being electrically connected to the specific power outlet and independent of any communication from the specific power outlet at the remote charging site, and
      transmitting the resolved geographic location of the subject vehicle at the specific power outlet from the control module of the subject vehicle through the handheld device to a central server;
   at the central server providing billing and access to the remote charging site:
      receiving the portion of the subject vehicle identification information and the resolved geographic location of the subject vehicle at the specific power outlet transmitted from the handheld device corresponding to the owner of the subject vehicle,
      identifying an owner of the specific power outlet at the remote charging site using the resolved geographic location of the subject vehicle at the specific power outlet, and
      transmitting an authorization signal to a monitoring computer of the remote charging site only when the owner of the specific power outlet has been identified;
   at the monitoring computer of the remote charging site:
      in response to the authorization signal transmitted from the central server, enabling electric power flow from an electric power utility to the subject vehicle to electrically charge the high-voltage battery when the subject vehicle is electrically connected to the specific power outlet at the remote charging site,
      monitoring a magnitude of cumulative electric power flow to the high-voltage battery of the subject vehicle from the electric power utility,
      locking access to the specific power outlet when one of said charging is completed and the subject vehicle is disconnected from the specific power outlet, and
      the magnitude of the monitored cumulative electric power flow to the central server that communicates with one or more utility billing systems associated with one or more electrical energy suppliers associated with the electric power utility; and
   at the one or more utility billing systems:
      reconciling billing for the cumulative electric power flow between the owner of the subject vehicle and the owner of the specific power outlet at the remote charging site.

2. The method of claim 1, wherein resolving the geographic location of the subject vehicle at the specific power outlet at the remote charging site comprises using a global positioning system to resolve the geographic location of the subject vehicle at the specific power outlet at the remote charging site.

3. The method of claim 1, wherein reconciling billing for the cumulative electric power flow between the owner of the subject vehicle and the owner of the remote charging site comprises using the central server to reconcile billing between a utility billing system associated with a first electrical energy supplier corresponding to the owner of the subject vehicle and a utility billing system associated with a second electrical energy supplier corresponding to the owner of the remote charging site.

4. Method for electrically charging a high-voltage battery of a subject vehicle, the method comprising:
   at a handheld device corresponding to an owner of the subject vehicle:
      monitoring a portion of subject vehicle identification information originating at the handheld device, the portion of the subject vehicle identification information including at least an owner of the subject vehicle, time and date information and a geographical location of the subject vehicle, and transmitting the geographical location of the subject vehicle to a control module of the subject vehicle;

onboard the subject vehicle:

resolving the geographic location of the subject vehicle at a specific electric power outlet at the remote charging site independent of the subject vehicle being electrically connected to the specific electric power outlet and independent of any communication from the specific electric power outlet at the remote charging site, and transmitting the resolved geographic location of the subject vehicle at the specific power outlet from the control module of the subject vehicle through the handheld device to a central server;

in the central server providing billing and access to the remote charging site:

receiving the portion of the subject vehicle identification information and the resolved geographic location of the subject vehicle at the specific power outlet transmitted from the handheld device corresponding to the owner of the subject vehicle, and transmitting an authorization signal to a monitoring computer of the remote charging site only when an owner of the specific electric power outlet at the remote charging site has been identified using the resolved geographic location of the subject vehicle;

in the monitoring computer of the remote charging site in response to the transmitted authorization signal, enabling electrical charging of the high-voltage battery from an electric power utility when the subject vehicle is electrically connected to the specific electric power outlet at the remote charging site;

monitoring cumulative electric power flow to the high-voltage battery of the subject vehicle from the electric power utility, locking access to the specific electric power outlet when one of said charging is completed and the subject vehicle is disconnected from the specific power outlet, and transmitting a magnitude of the monitored cumulative electric power flow to the central server via a network server that communicates with one or more utility billing systems associated with one or more electrical energy suppliers associated with the electric power utility; and in the one or more utility billing systems:

reconciling billing for the cumulative electric power flow between an owner of the subject vehicle and the owner of the specific electric power outlet at the remote charging site.

5. The method of claim 4, wherein reconciling billing for the cumulative electric power flow between the owner of the subject vehicle and the owner of the remote charging site comprises using the central server to reconcile billing between a utility billing system associated with a first electrical energy supplier corresponding to the owner of the subject vehicle and a utility billing system associated with a second electrical energy supplier corresponding to the owner of the remote charging site.

6. Method for electrically charging a high-voltage battery of a subject vehicle, the method comprising:

at a handheld device corresponding to an owner of the subject vehicle:

monitoring a portion of vehicle identification information originating at the held device, the portion of the vehicle identification information including at least an owner of the subject vehicle, time and date information and a geographical location of the subject vehicle, and transmitting the geographical location of the subject vehicle to a control module of the subject vehicle;

onboard the subject vehicle:

resolving the geographic location of the subject vehicle at one of a plurality of electric power outlets located at the remote charging site independent of the subject vehicle being electrically connected to the electric power outlet and independent of any communication from the electric power outlet at the remote charging site, and wirelessly communicating the resolved geographic location of the subject vehicle from the control module of the subject vehicle through the handheld device to a central server;

in the central server:

receiving the portion of the subject vehicle identification information and the resolved geographic location wirelessly communicated from the handheld device corresponding to the owner of the subject vehicle;

identifying an owner of the one of the plurality of electric power outlets located at the remote charging site using the resolved geographic location of the subject vehicle, and transmitting an authorization signal to a monitoring computer of the remote charging site only when the owner of the specific power outlet has been identified;

in the monitoring computer of the remote charging site:

in response to the authorization signal transmitted from the central server, unlocking the one of the plurality of electric power outlets located at the remote charging site to permit electrical charging of the high-voltage battery of the subject vehicle using electric power flow from an electric power utility;

electrically charging the high-voltage battery through a connection of the subject vehicle to the one of the plurality of electric power outlets located at the remote charging site;

monitoring a cumulative electric power flow to the high-voltage battery of the subject vehicle from the electric power utility;

transmitting a magnitude of the monitored cumulative electric power flow to the central server that communicates with one or more utility billing systems associated with one or more electrical energy suppliers associated with the electric power utility;

locking access to the specific power outlet when of said charging is completed and the subject vehicle is disconnected from the one of the plurality of electric power outlets; and in the one or more utility billing systems:

reconciling billing for the cumulative electric power flow between the owner of the one of the plurality of electric power outlets located at the remote charging site and the owner of the subject vehicle.

7. The method of claim 6, wherein reconciling billing for the cumulative electric power flow between the owner of the one of the plurality of electric power outlets located at the remote charging site and the owner of the subject vehicle comprises reconciling billing between a utility billing system associated with a first electrical energy supplier corresponding to the owner of the subject vehicle and a utility billing system associated with a second electrical energy supplier corresponding to the owner of the one of the plurality of electric power outlets located at the remote charging site.

\* \* \* \* \*